(No Model.)
J. G. A. KITCHEN.
PNEUMATIC TIRE.
No. 508,724. Patented Nov. 14, 1893.
Fig. 1.
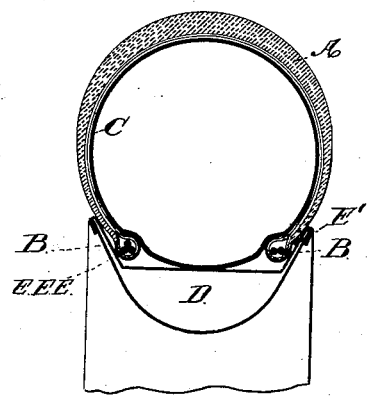
Fig. 2.
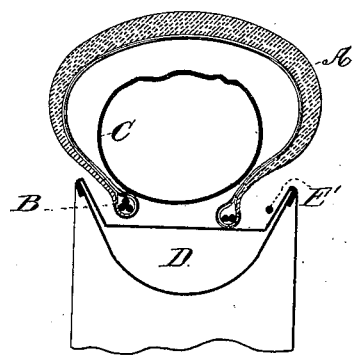
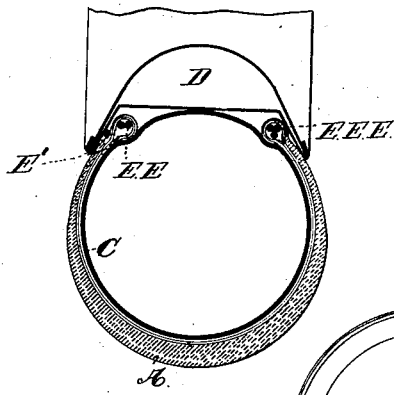
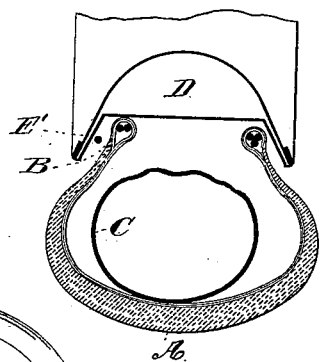
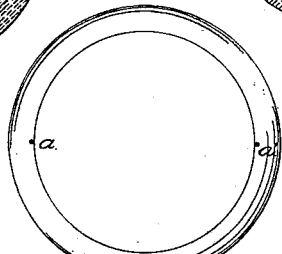
Fig. 3.
Fig. 4.
Fig. 5.
Witnesses:
Hubert E. Beck
Chas. M. Werle
Inventor:
J. G. A. Kitchen
by O. E. Duffy
Attorney
THE NATIONAL LITHOGRAPHING COMPANY,
WASHINGTON, D. C.

UNITED STATES PATENT OFFICE.

JOHN GEORGE AULSEBROOK KITCHEN, OF ST. HELEN'S, ENGLAND.

PNEUMATIC TIRE.

SPECIFICATION forming part of Letters Patent No. 508,724, dated November 14, 1893.

Application filed July 31, 1893. Serial No. 481,990. (No model.)

*To all whom it may concern:*

Be it known that I, JOHN GEORGE AULSEBROOK KITCHEN, a subject of the Queen of Great Britain and Ireland, residing at St. Helen's, in the county of Lancaster, England, have invented Improvements in or Relating to Pneumatic Tires, of which the following is a specification.

This invention of improvements in or relating to pneumatic tires has for object to provide simple means for attaching the outer coverings of pneumatic or inflated tires to the rims of cycle or other vehicle wheels in such a manner as to retain the tire in position whether fully inflated or otherwise, when in use, and also to enable the same to be quickly removed from and replaced upon the rim when desired.

Hitherto detachable inflated tires have been usually attached to wheel rims of special section by a wire ring incased in the folded over edges of the outer cover and held against the inner sides of the groove in the wheel rim by the air tube when the same is inflated, but with such construction when the air tube is only partially inflated the cover and wire rings are liable to slip or creep around the wheel rim.

Now this invention has for its object to enable the outer cover of a pneumatic tire to be securely attached to any ordinary wheel rim suitable for the reception of an inflated tire in such a manner that it cannot slip or creep around or be accidentally forced off the wheel rim sidewise whether the tire be inflated or not. For this purpose instead of employing a single wire ring incased in each edge of the outer cover as heretofore, I construct each edge of the said cover with a metal ring capable of being expanded or contracted and composed of two or more continuous turns or coils of wire, one portion of a turn or coil of each ring being arranged outside the cover as and for a purpose hereinafter described.

In the accompanying drawings:—Figure 1 is a cross section of so much of a cycle wheel as is necessary to illustrate the nature of this invention, the tire being shown fully inflated. Fig. 2 is a similar view showing the air tube deflated and the outer casing slack. Fig. 3 is a side elevation on a smaller scale showing the outer casing. Figs. 4 and 5 are diagrammatic views hereinafter referred to.

A. is the ordinary outer cover of the tire having tubular edge portions B. formed by the turned over edges of the canvas and rubber.

C is the air tube and D the wheel rim. Each of the tubular portions B. of the cover A. is formed with two small holes $a$. $a'$ (Fig. 3) arranged diametrically opposite each other. Into each hole $a$. is inserted one end of a wire E. which is passed around within the tubular portion B. say about two and a half times. The end of the wire is then passed out through the second opening $a'$. and after measuring off sufficient length of wire to complete a third turn the two ends are connected, thus forming three complete coils, two and a half turns or coils, or approximately so, being within the tubular portion B. of the cover A. and the remaining half turn or coil being outside thereof.

Fig. 4. represents the three coils of wire when the tire is detached from the wheel rim, the dotted lines indicating the two and a half coils within the tubular edge B. of the cover and the full line the free half coil which is outside of the said tubular edge B. Fig. 5. similarly represents the coils of wire in their normal positions when on the wheel rim D. The length of wire used is such that the diameter of the ring composed of the three coils of wire when these coils are equally expanded is only slightly larger than the smallest diameter of the wheel rim D.

In attaching the cover A. to the wheel rim D. that portion of the cover containing the three turns or portions of wire E. E. E. is placed within the hollow rim D., the half turn which is outside the tubular portion of the cover being stretched from the hole $a$. to the hole $a'$. diametrically across the wheel and which will equal the difference between the diameter and the semi-circumference of the wheel rim to be equally distributed throughout the two and a half turns of wire which are within the tubular portion B. thus enabling the remaining half of the cover, that is to say the half containing only two coils or portions E. E. (Fig. 4) to be slipped over the enlarged portion or flange of the rim D. The exposed portion E' of the wire is then drawn tight so as to take up the slack in the two and a half turns which is just sufficient to allow of the exposed portion of the wire being slipped over the wheel flange into the positions shown in Figs. 1 and 2 when the tire is ready for inflation. As the tire is inflated the three complete coils of wire regulate themselves so as to have an equal tension throughout the rings. It will thus be seen that by constructing the wire ring with two or more turns or coils only a very small amount of slack is necessary to enable the last or exposed half turn of wire to be inserted, and also that wheel rims having very little flange may be used, there being by this arrangement no liability of the casing leaving the wheel rim whether inflated or not. To detach the tire from the wheel rim the air tube is deflated one side of the casing is moved away from the edge of the wheel rim as shown in Fig. 2, and the portion of wire E' is then drawn tight and passed over the flange or projecting edge of the wheel rim after which the slack is free to become distributed throughout the other turns. The tire can then be easily removed from the wheel rim as will be readily understood. The wire may be made of any suitable material such as steel, phosphor bronze or the like and the two ends may be securely connected together in any suitable manner as when once connected they remain so. I find for ordinary cycle wheels three turns are most suitable for attaching the covers and tires but the number of turns may be varied to suit requirements.

In some cases one edge only of the outer cover may be provided with an expansible wire ring such as described, the other edge being permanently or otherwise secured to the wheel rim.

What I claim is—

1. For a pneumatic tire an outer cover having a tubular edge provided with a continuous unbroken wire ring, composed of two or more continuous turns or coils a portion of one of such turns or coils being outside of said tubular edge and resting within the rim of the wheel substantially as herein described for the purpose specified.

2. In a pneumatic tire, the combination with a wheel rim and an air tube, of an outer cover provided with one or more complete continuous turns or coils of suitable material one portion of one of said turns or coils being arranged free of the cover and resting loosely in the rim of the wheel so that said free portion can be rolled out of the rim to loosen the coils in said cover as set forth.

3. A pneumatic wheel tire having an outer cover formed with tubular edges each formed with two perforations and provided with a ring composed of two or more continuous turns or coils of wire, one portion of one of said turns or coils extending through said perforations and arranged external to said cover, and resting loosely in the rim of the wheel while the remainder of the turns or coils are located within the corresponding tubular edge thereof substantially as herein described for the purpose specified.

In testimony whereof I have signed my name to this specification in the presence of two subscribing witnesses.

JOHN GEORGE AULSEBROOK KITCHEN.

Witnesses:
F. M. C. SCOTT,
J. CUFF,

*Both of* 89 *Victoria Street, Liverpool.*